United States Patent [19]
Driear

[11] Patent Number: 5,119,928
[45] Date of Patent: Jun. 9, 1992

[54] ENGINE MOUNTING CONSTRUCTION FOR A PORTABLE CONVEYOR

[75] Inventor: Joseph R. Driear, Thiensville, Wis.
[73] Assignee: Robert D. Sawyer, Oak Creek, Wis.
[21] Appl. No.: 578,435
[22] Filed: Sep. 7, 1990
[51] Int. Cl.$^5$ .............................................. B65G 21/10
[52] U.S. Cl. .................................. 198/319; 198/861.1
[58] Field of Search ...................... 198/318, 319, 860.1, 198/861.1

[56] References Cited

U.S. PATENT DOCUMENTS

| | | |
|---|---|---|
| 1,530,564 | 3/1925 | Lemmon . |
| 2,444,521 | 7/1948 | Mulkey et al. ................ 198/319 X |
| 2,446,660 | 8/1948 | Mulkey et al. ................ 198/319 |
| 2,515,988 | 7/1950 | Conrad ............................ 198/319 |
| 2,519,478 | 8/1950 | King . |
| 2,528,917 | 11/1950 | Slocum ........................... 198/319 |
| 2,572,290 | 10/1951 | Vutz ............................... 198/319 X |
| 2,751,063 | 6/1956 | Wilcoxen et al. ............... 198/319 |
| 2,759,591 | 8/1956 | Erickson ........................ 198/319 X |
| 2,831,566 | 4/1958 | Beldin et al. .................. 198/319 |
| 2,998,120 | 8/1961 | Hagen ............................. 198/319 |
| 3,141,541 | 7/1964 | Mayrath ......................... 198/319 |
| 3,156,341 | 11/1964 | Wilcoxen ........................ 198/319 X |
| 3,280,965 | 10/1966 | Schwerdtfeger ................ 198/319 X |
| 3,307,684 | 3/1967 | Gilmore et al. ............... 198/319 |
| 3,331,492 | 7/1967 | Knutson et al. ................ 198/319 X |
| 4,526,265 | 7/1985 | Enns . |

FOREIGN PATENT DOCUMENTS 202445 6/1956 Australia .
210995 10/1957 Australia .
550466 9/1956 Belgium .
688128 1/1940 Fed. Rep. of Germany .
235683 4/1945 Switzerland .
570034 6/1945 United Kingdom .

OTHER PUBLICATIONS

"Job Set-Up Procedures", Jun. 1988.

Primary Examiner—D. Glenn Dayoan
Attorney, Agent, or Firm—Andrus, Sceales, Starke & Sawall

[57] ABSTRACT

An engine mounting construction for a portable conveyor. The conveyor includes a frame and a conveyor belt is mounted for travel on the frame. A gasoline engine is secured to a skid and the skid is removably mounted on a support that is pivoted to the conveyor frame through a four-bar linkage. The connection between the skid and the support consists of a pair of open ended slots on the skid, which engage locating pins on the support, plus a pair of locating pins on the support which are received in holes in the skid. A manually operated clamp secures the skid to the support. Installation of the skid on the support will effect engagement of a coupling on the engine drive shaft with a coupling on a driven shaft that is operably connected to the drive roll for the conveyor belt. The four-bar linkage enables the engine to be moved arcuately about the axis of the conveyor drive roll, while maintaining the engine in generally the same orientation with respect to a horizontal plane.

8 Claims, 2 Drawing Sheets

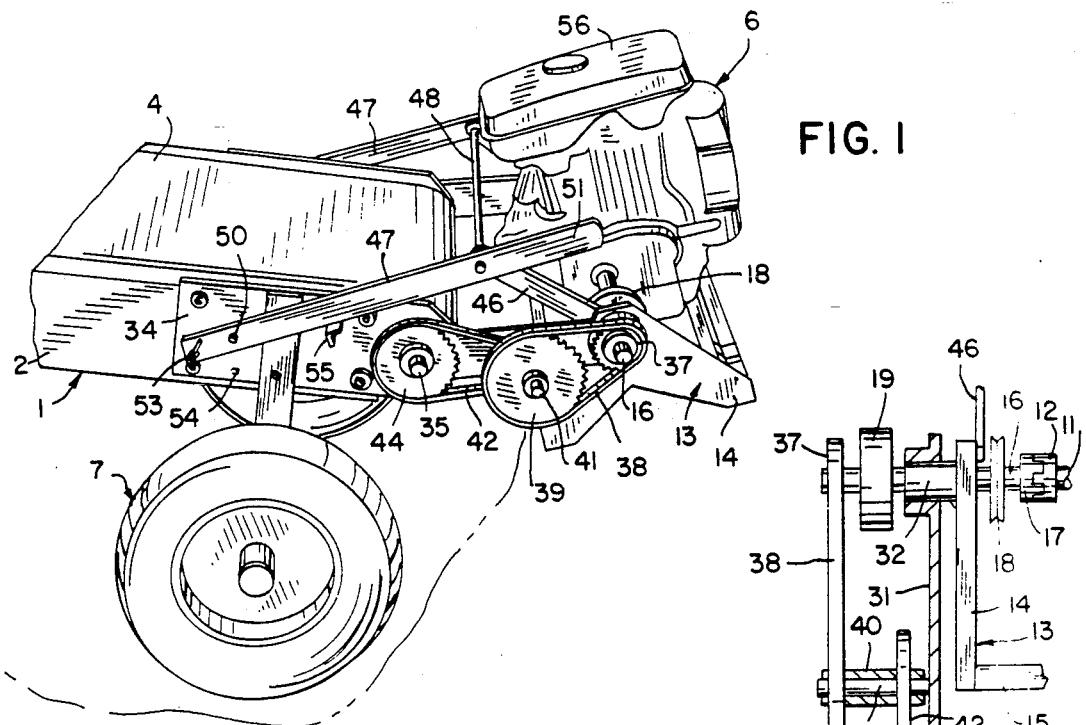
FIG. 1
FIG. 4
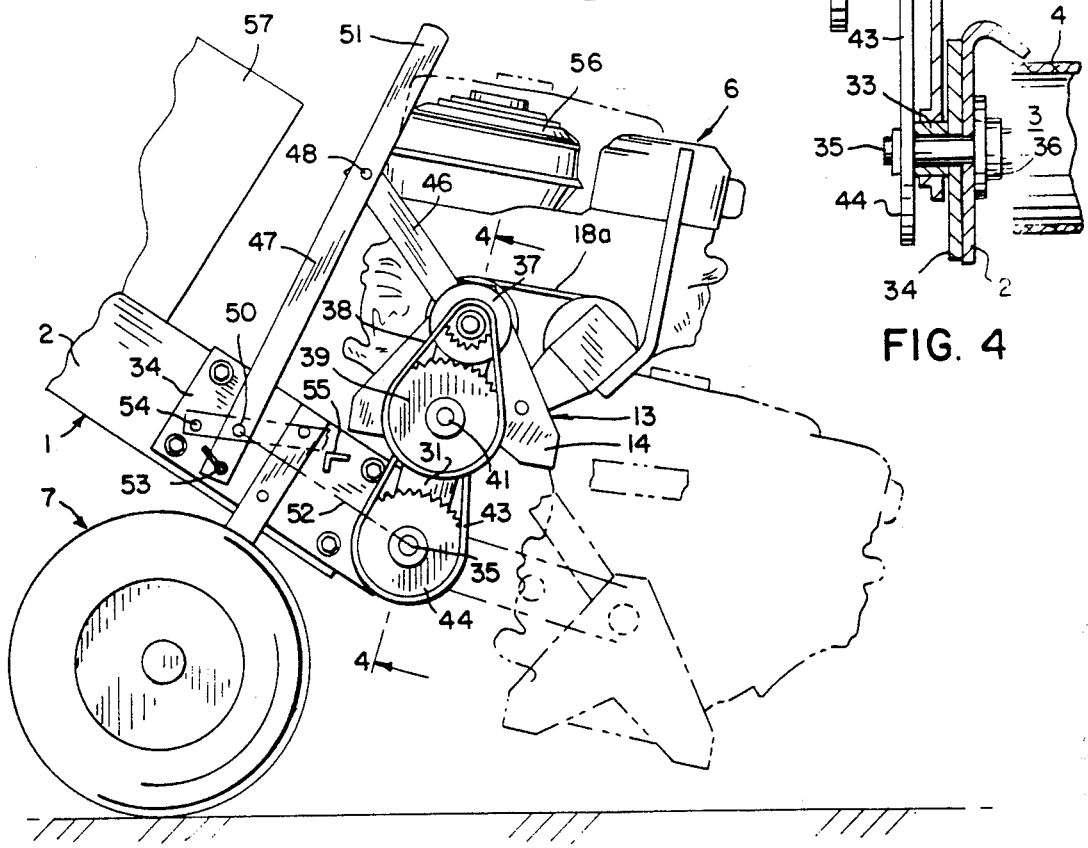
FIG. 2

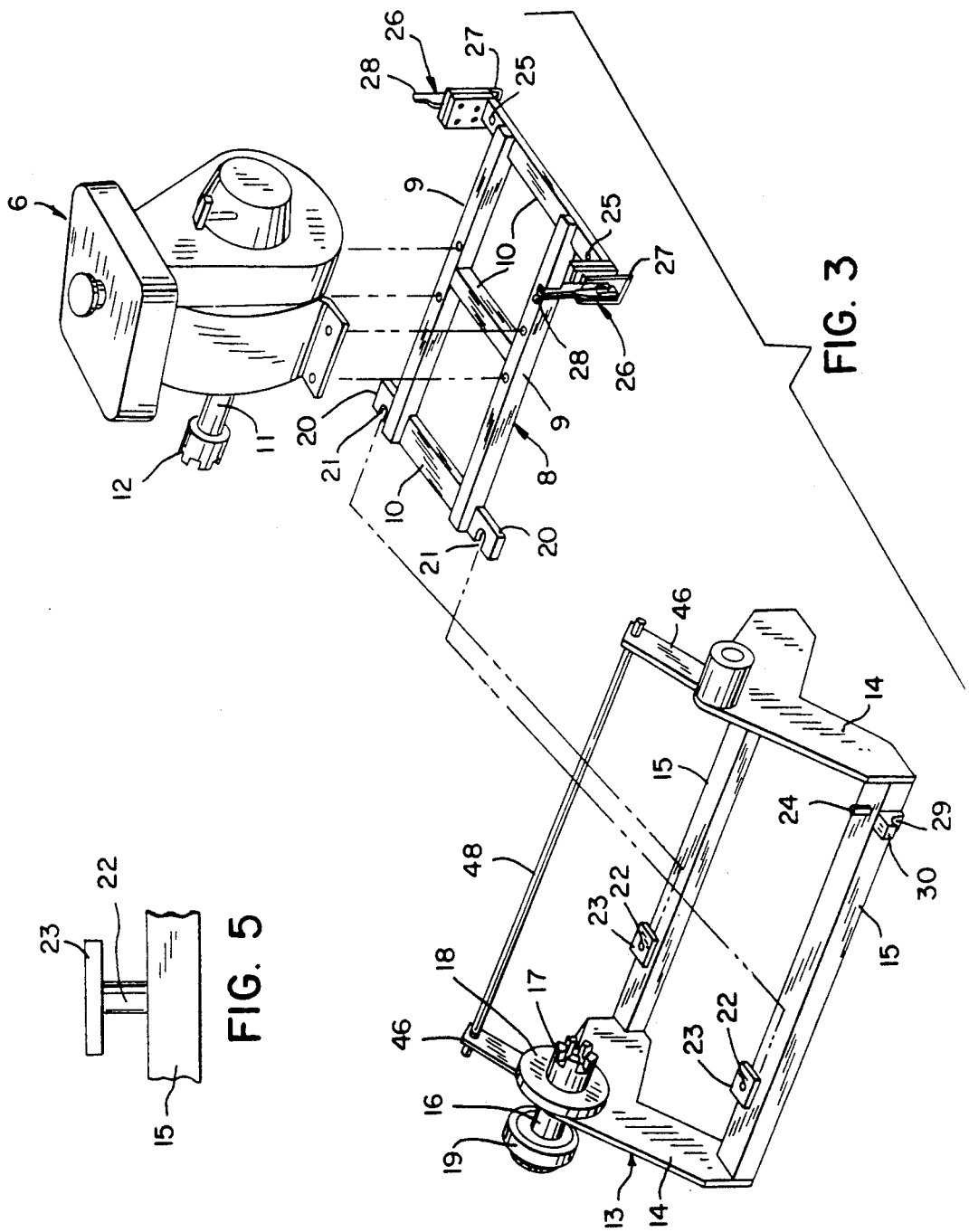

ENGINE MOUNTING CONSTRUCTION FOR A PORTABLE CONVEYOR

BACKGROUND OF THE INVENTION

Portable conveyors are used for conveying bulk material such as sand, gravel, concrete, and the like. The typical portable conveyor includes an endless conveyor that is located at an inclined angle and the bulk material is fed to the lower end of the inclined conveyor and is discharged from the upper end to a location of use.

In the conventional portable conveyor, the conveyor belt is driven by a power source such as a gasoline engine, or an electric or hydraulic motor, that is operably connected to the conveyor drive roll at the lower end of the conveyor frame. The engine is fixed in position relative to the conveyor and projects upwardly above the lower end of the conveyor belt. With the engine located in this position, it restricts feeding of material to the conveyor, in that it is difficult to feed concrete or other bulk material over the engine onto the conveyor.

As a further disadvantage, the engine for the conventional portable conveyor cannot readily be removed from the conveyor. A period of about 30 to 40 minutes is normally required for removal of the engine. Because of the difficulty in removing the engine from the conveyor, the engine is usually maintained on the conveyor when the conveyor is stored overnight or for weekends at a construction site. As a result, the engines are frequently stolen. To prevent theft, the conveyor is often suspended in an above-ground position by a crane during downtime or storage periods, if a crane or hoist is available at the construction site.

A further problem arises during transporting of the conveyor. The conveyor is normally transported on a ladder rack mounted on the top of a truck and the conveyor engine is normally located at the rear of the truck. As the engine has a substantial weight, the conveyor must be cantilevered forward to balance the weight As the typical conveyor may be 25 to 30 feet in length, shifting the conveyor forwardly on the truck to balance the weight can exceed the 5 foot overhang limit for legal conveyance. Because of this, it would be desirable to be able to readily remove the engine from the conveyor during transporting.

In the typical portable conveyor, the engine is mounted in fixed relation to the conveyor frame. In certain instances it would be of advantage to move the engine relative to the conveyor to provide greater access for feeding the concrete or bulk material to the conveyor, or in discharging the material from the conveyor.

SUMMARY OF THE INVENTION

The invention is directed to an engine mounting construction for a portable conveyor that incorporates a "quick disconnect" feature for the engine and also enables the engine to be moved relative to the conveyor frame to provide better feeding access to the conveyor and to enable the engine to be located in the most advantageous position during conveyor operation or transporting.

In accordance with the invention, the conveyor includes a conveyor frame and a conveyor belt is mounted on a drive roll that is journalled on the lower end of the frame. A standard gasoline or diesel engine is secured to a skid and the skid is removably mounted on a support that is pivoted to the conveyor frame through a four-bar linkage.

The connection between the skid and the support consists of a pair of open-ended slots on the skid that engage pins on the support, plus a pair of locator pins on the support, which are received in holes in the skid. In addition, a manually operated clamp secures the skid to the support.

The drive shaft of the engine carries a jaw-type coupler which is aligned and engaged with a complementary jaw-type coupler on the support, as the skid is mounted on the support. With this construction, the engine can be readily installed or removed from the conveyor in a period of less than 15 seconds.

The four-bar linkage enables the engine to be moved arcuately about the axis of the conveyor drive roller, without effecting the drive connection between the engine drive shaft and the conveyor drive roller. The four-bar linkage maintains the engine in substantially the same orientation with respect to the horizontal, as the engine is moved between a high position and a low position relative to the conveyor. This ensures that the oil sump on the engine is not tilted to a degree which would cause leakage of the oil, or damage the engine because oil in the sump flowed away from the oil pump intake, as the engine is moved between the high and low positions.

The invention enables the engine to be readily removed from the conveyor in downtime periods, thus eliminating the possibility of theft of the engine. The "easy disconnect" feature also permits the engine to be removed from the conveyor during transporting, so that the conveyor can be transported within the legal conveyance limits and to lighten the conveyor for handling over difficult terrain.

As the engine can be pivoted between a high and low position relative to the conveyor, the conveyor has greater versatility, enabling the engine to be located in the most desirable position for operating and transporting operations.

Other objects and advantages will appear in the course of the following description.

DESCRIPTION OF THE DRAWINGS

The drawings illustrate the best mode presently contemplated of carrying out the invention. Safety shields are not shown in order that components can be more clearly depicted.

In the drawings:

FIG. 1 is a perspective view of a portion of the conveyor of the invention, with the engine shown in a low position;

FIG. 2 is a fragmentary side elevation of the rear end of the conveyor with the engine shown in a high position, and showing one possible location of a feed hopper;

FIG. 3 is an exploded perspective view showing the connection of the engine to the support on the conveyor frame;

FIG. 4 is a section taken along line 4—4 of FIG. 2 and showing the chain drive connection between the engine drive shaft and the conveyor roller; and FIG. 5 is an enlarged fragmentary side elevation showing a locating pin on the support.

DESCRIPTION OF THE ILLUSTRATED EMBODIMENT

The drawings illustrate a portable conveyor, which has particular use in conveying bulk materials, such as concrete, sand, gravel, and the like. The conveyor comprises a frame 1 including a pair of spaced vertical side plates 2, and a drive roll 3 is journalled between the side plates and serves to drive an endless conveyor belt 4.

The conveyor is normally disposed in an inclined position and bulk material to be conveyed is fed into a hopper 57 located at the low end of the conveyor belt. The belt 4 is driven by a standard gasoline or diesel engine 6, which is mounted on the low end of the conveyor frame. The conveyor can be moved over the terrain through a wheel assembly 7, which is attached to the lower end of the frame, along with a forward wheel assembly, not shown, which is located beneath the central portion of the conveyor. The wheel assemblies, as well as the mechanism for raising and lowering the conveyor frame 1, can be constructed as shown in U.S. patent application No. 07/361,495, filed Jun. 5, 1989, now U.S. Pat. No. 4,955,955 which is incorporated herein by reference.

In accordance with the invention, engine 6 is secured to a skid 8, as illustrated in FIG. 3. Skid 8 includes a pair of parallel side rails 9 which are connected by cross members 10 and the base of the engine 6 is bolted to the side rails 9.

Engine 6 includes a drive shaft 11, carrying a standard three-jaw coupling half 12, which incorporates a flexible plastic or rubber cushion to accommodate misalignment of coupling halves.

Skid 8, which carries engine 6, is removably connected to a support 13 that is mounted for arcuate movement relative to conveyor frame 1. As best shown in FIG. 3, support 13 includes a pair of end members 14, and the lower ends of the end members are connected by a pair of parallel rails 15. A shaft 16 is carried by the upper end of one of the end members 14 and is provided with a three-jaw coupling half 17 which is adapted to mate and engage the coupling half 12 of engine 6. In addition, a pulley 18 is mounted on shaft 16 and may be connected via a belt 18a to a hydraulic pump mounted on one of the end members 14 in a manner to permit movement of the pump to tighten the belt for driving the pump or loosen the belt to discontinue driving of the engine. Mounted on the opposite end of shaft 16 is a conventional centrifugal clutch 19.

To connect skid 8 to support 13, the side rails of skid 8 are provided with laterally extending lugs 20 and each lug is provided with an open-ended slot 21, which is adapted to engage a pin 22 that extends upwardly from the respective rails 15 of support 13. The upper end of each pin 22 carries a plate 23 and the lugs 20 are received within the space between the plates 23 and rails 15, thus preventing upward movement of the skid relative to the support.

In addition, a locating pin 24 extends upwardly from each rail 15 and the pins 24 are received within holes 25 formed in a cross member 10 of skid 8.

Clamps 26 are mounted on the ends of the rear cross member 10 and serve to secure the end of the skid to the support 13. Clamps 26 are a conventional type and include a loop 27 which is connected to a lever 28. The end of each loop 27 is adapted to engage a notch 29 in a lug 30 that extends laterally from the respective side rails 15 of support 13. Through pivotal movement of levers 28, loops 27 will draw the end of the skid 8 into tight engagement with the support 13.

To assemble the engine to the conveyor, the slots 21 on skid 8, which carries the engine 6, are engaged with pins 22 and couplers 12 and 17 are brought into mating engagement. The end of the skid is then lowered to cause engagement of pins 24 with holes 25. With the skid 8 and engine properly located relative to support 13, clamps 26 can then be tightened to secure the skid and engine to the support 13. To remove the engine, the procedure is reversed.

Engine 6 is adapted to be moved arcuately relative to conveyor frame 1 from a high position, as shown in FIG. 2, to a low position, as best shown by the dashed lines in FIG. 2. To provide this arcuate action, the support 13 is connected to the conveyor frame through a four-bar linkage. More particularly, the upper end of a link 31 is journaled on sleeve 32 that is connected to end member 14 of support 13, as illustrated in FIG. 4. Shaft 16 is journaled within sleeve 32.

The lower end of link 31 is mounted for rotation on hub 33 which is connected to reinforcing plate 34 that is mounted through bolts to the outer surface of side member 2 of conveyor frame 1. The ends of shaft 35, which is part of drive roll 3, are journaled in bearing assemblies 36, that are attached to the inner surfaces of side member 2 and one end of shaft 35 extends through a clearance hole in hub 33, as illustrated in FIG. 4.

To drive the conveyor shaft 35, a sprocket 37 is mounted on the end of shaft 16 outboard of clutch 19, and sprocket 37 is connected via chain 38 to a sprocket 39 that is mounted on sleeve 40. Sleeve 40 is journaled on stub shaft 41 which extends outwardly from link 31.

A second sprocket 42 is also fixed on sleeve 40 and is located inboard of sprocket 39, as seen in FIG. 4. Sprocket 42 is connected through roller chain 43 to a sprocket 44 that is secured to the outer end of shaft 35. With this construction, the conveyor drive roll 3 is driven through the sprocket and roller chain drive which also provides a speed reduction.

To provide adjustment or tightening of the roller chains, the stub shaft 41 can be adjusted laterally or axially of the link 31 through a suitable slotted connection, not shown.

The four-bar linkage also includes a pair of links 46, each fixedly connected to an end member 14, and the upper end of each link 46 is connected to a link 47 through a rod 48, which is fixed to link 46 and which pivots in link 47. The lower end of each link 47 is pivotally connected to the respective reinforcing plate 34 at pivot 50, while the upper end of each link 47 defines a handle 51. Thus, the four-bar linkage is comprised of links 31, 46, 47 and the portion of plate 34 extending between pivot 50 and shaft 35 of conveyor roller 3 (shown by the dashed line 52 in FIG. 2). By manual movement of the handle 51, the support 13 and the engine 6 can be moved between a high position, as shown by the full lines in FIG. 2, and a low position shown by the dashed lines. Because the engine 6 moves arcuately about the axis of conveyor roll 3, the length or tension of the roller chain drive between the engine shaft and the conveyor roll will not be effected or altered by the arcuate movement.

To secure the engine in position relative to the conveyor frame, the lower end of one of the links 47 carries a spring loaded plunger 53, which is adapted to engage one of a series of holes 54 in plate 34. Engagement of the plunger with one of the holes 54 will maintain the links 47 in position relative to conveyor frame 1 and thus maintain the engine 6 at any desired position. To limit the downward pivoting movement of support 13 and engine 6, stops 55 are secured to each plate 34 and are adapted to be engaged by the respective links 47, as seen in FIG. 1. Links 47 are constrained to move in synchronization due to a rigid frame formed by 48, 46, 14, 15, 14 and 46.

With the "quick disconnect" arrangement of the invention, the engine can be readily removed from the conveyor in a period of approximately 5 seconds. Thus, the engine can be removed from the conveyor during storage or downtime periods so that the possibility of theft of the engine during these periods is eliminated or to reduce the carrying weight of the conveyor.

As the engine can be moved between a high and low position, the conveyor is more versatile and enables the engine to be located in the most desirable position during operation and transporting. Particularly desirable is the ability to move the engine 6 to the lowest position during operation to bring the top of the fuel tank 56 down out of the working space needed to feed material, such as concrete, to feed hopper 57, which is commonly mounted immediately forward of the engine. Thus, obstruction of the workspace is eliminated to provide more efficient feeding of the material to the hopper. Further, the fuel tank 56 is located in a low position where damage to it by feeding equipment is less likely to occur.

In those circumstances where the conveyor is used without the undercarriage, for example, in conveying material through a basement window, the engine can be moved to a higher position and operated in that position to provide necessary under-clearance for proper positioning of the conveyor.

Various modes of carrying out the invention are contemplated as being within the scope of the following claims particularly pointing out and distinctly claiming the subject matter which is regarded as the invention.

I claim:

1. An engine mounting construction for a conveyor, comprising a conveyor frame, a conveyor member mounted for travel on said conveyor frame, a rotatable drive member operably connected to said conveyor member to drive said conveyor member, an engine having a driveshaft, support means for supporting said engine, mounting means for mounting said support means for arcuate movement about the axis of said drive member, and connecting means for connecting said drive shaft to said drive member,, said mounting means including a link having one end journaled about the axis of said drive shaft and the other end journaled about the axis of said drive member.

2. An engine mounting construction for a conveyor, comprising a conveyor frame, a conveyor member mounted for travel on said conveyor frame, a rotatable drive member operably connected to said conveyor member to drive said conveyor member, an engine having a drive shaft, support means for supporting said engine, mounting means for mounting said support means for arcuate movement about the axis of said drive member, connecting means for connecting said drive shaft to said drive member, and means for maintaining the engine at a generally constant angle to the horizontal when said frame is in a fixed position as said support means is moved arcuately relative to said conveyor frame, said means for maintaining the engine at a generally constant angle to the horizontal comprising a four-bar linkage interconnecting said drive shaft, said drive member, and said frame.

3. The construction of claim 2, and including releasable locking means for locking said support means to said conveyor frame.

4. The construction of claim 2, wherein said four-bar linkage comprises a first link having a first end pivotally connected to said frame at a first pivot and having a second end connected to said drive shaft at a second pivot, a second link having a first end pivotally connected to said first link at said second pivot and having a second end, a third link having a first end pivotally connected to the second end of said second link at a third pivot and having a second end pivotally connected to said said frame at a fourth pivot, the portion of said frame between said fourth pivot and said first pivot constituting a fourth link.

5. The construction of claim 2, wherein said conveyor frame has a high end and a low end and said rotatable drive member is located at said low end.

6. An engine mounting construction for a conveyor, comprising a conveyor frame, a conveyor member mounted for travel on said conveyor frame, a rotatable drive member operably connected to said conveyor member to drive said conveyor member, an engine having a driveshaft, support means for supporting said engine, mounting means for mounting said support means for arcuate movement about the axis of said drive member, and connecting means for connecting said drive shaft to said drive member, said connecting means comprising first coupling means connected to said drive shaft, second coupling means operably connected to said drive member and mounted on said support means, and locating means interconnecting said support means and said mounting means for axially aligning said first and second coupling means.

7. The construction of claim 6, and including manually operable clamping means for removably clamping said support means to said mounting means.

8. The construction of claim 7, wherein said locating means comprises an open ended slot on one of said support means and said mounting means, and a locating element disposed to be received within said slot and mounted on the other of said support means and mounting means, said open ended slot facing in a direction parallel to the axis of said drive shaft, said slot and said locating element being constructed and arranged such that engagement of said locating element with said slot will engage said coupling means.

* * * * *